United States Patent

Grove et al.

[15] 3,638,475
[45] Feb. 1, 1972

[54] METER-PROVING METHOD AND APPARATUS

[72] Inventors: Marvin H. Grove; Lyle R. Van Arsdale, both of Houston, Tex.

[73] Assignee: M & J Valve Company, Houston, Tex.

[22] Filed: Apr. 9, 1970

[21] Appl. No.: 26,834

[52] U.S. Cl. ............................................................73/3
[51] Int. Cl. .................................................G01f 25/00
[58] Field of Search ....................73/3, 195; 15/104.6 A

[56] References Cited

UNITED STATES PATENTS

| | | | |
|---|---|---|---|
| 3,504,523 | 4/1970 | Layhe | 73/3 |
| 3,541,837 | 11/1970 | Davis et al. | 73/3 |
| 3,295,357 | 1/1967 | Halpine et al. | 73/3 |

*Primary Examiner*—Louis R. Prince
*Assistant Examiner*—William A. Henry, II
*Attorney*—Flehr, Hohbach, Test, Albritton & Herbert

[57] ABSTRACT

Meter-proving method and apparatus for calibrating liquid flow metering devices. It employs a metering pipe or loop through which the flow is diverted. A plug or sphere is launched into the inlet end of the pipe and is propelled through the pipe by the liquid flow during a proving run. A special sphere-launching device is provided to launch the sphere into the inlet end of the metering pipe, and also to retain the sphere after it has cleared the pipe, whereby it is ready for the next prover run. This device is constructed to establish seals between the inlet and outlet ends of the proving pipe during and after a run. Its inner shuttle part is movable between sphere retaining and launching positions, and in both positions line flow occurs directly through the device. The inner shuttle part can be withdrawn for replacement of a sphere. Leak detecting means is associated with the seals of the device to detect any leakage.

12 Claims, 9 Drawing Figures

FIG_7

FIG_6

FIG_8

3,638,475

1

METER-PROVING METHOD AND APPARATUS

BACKGROUND OF THE INVENTION

This invention relates generally to flow meter proving methods and apparatus such as are employed in conjunction with pipe line transmission systems.

In connection with piping systems for conveying various liquid petroleum products, it is important to provide accurate flow-metering means. Conventional flow-metering devices of the positive displacement or turbine types are subject to serious inaccuracies that may be cumulative. For this reason it is common to use so-called meter provers which make accurate periodic checks of the flow for calibration of the meter. A conventional form of meter prover consists of an extended length of metering pipe of uniform internal diameter and through which the main flow of the piping system can be directed. Some means is employed to enable a plug or sphere to be launched into the inlet end of the metering pipe whereby it is propelled by flow through the pipe to the outlet end thereof, where it is available for relaunching into the inlet end. As shown in U.S. Pat. No. 3,387,483, the means for launching and retrieving the plug or sphere may be in the form of an interchange provided with valves through which the sphere may pass before reaching a launching position. By means of an associated electrical system which is activated when the sphere passes through sphere-detecting stations near the inlet and discharge ends, a flow meter reading is obtained for the time interval which is required for the travel of the sphere between the detecting points. This reading is then taken together with the known calculated volume of the metering pipe between the detecting points to provide accurate calibration data. It is characteristic of such meter provers that the sphere is launched through a tee which is connected to the inlet end of the metering pipe. With such meter provers, it is important to prevent any leakage between the inlet and outlet ends of the metering pipe during a metering run, because such leakage interferes with the desired accuracy.

Prior meter-proving methods and apparatus are subject to a number of disadvantages. Particularly, the interchange is relatively expensive, and its design characteristics complicate and make installation of a complete meter prover system expensive. Although the interchange may be constructed as disclosed in U.S. Pat. No. 3,387,483, thereby minimizing transfer of undesired sludge solids back into the inlet end of the metering pipe, this difficulty is not entirely alleviated, because any sludge solids which are permitted to pass through the interchange are recirculated through the metering pipe. Sludge or other foreign solids present in the liquid passing through the metering pipe interferes with proper movement of the sphere, and thus interferes with the desired accuracy.

SUMMARY OF THE INVENTION AND OBJECTS

An object of the present invention is to provide a meter-proving method and apparatus characterized by a simplified procedure and device for receiving the sphere at the end of a run and for relaunching the sphere into the inlet end of the metering pipe.

Another object of the invention is to provide a method and apparatus of the above character which avoids the use of a connecting tee in launching the sphere into the inlet end of the metering pipe.

Another object is to provide a meter prover method and apparatus having novel means for retrieving the sphere after a run.

Another object of the invention is to provide an apparatus of the above character having a novel device for retrieving the sphere and for relaunching it into the metering pipe, the device being characterized by simplicity of construction and operation, and by the fact that the line flow occurs directly through the same.

Another object of the invention is to provide a meter-proving method and apparatus having novel provision for detecting any leakage which would interfere with metering accuracy.

2

In general, the present method makes use of a length of metering pipe through which the normal flow of a piping system can be diverted. This metering pipe is adapted to receive a sphere whereby the sphere is propelled through the metering pipe between predetermined sphere-detecting points. Before commencing a metering run, the sphere is loosely retained in a movable shuttle part which is disposed within an enclosed body. Both the shuttle part and the body form parts of a sphere-launching device. To start a run, the shuttle part is shifted from a first to a second position which brings the sphere into alignment with inlet and outlet passages in the body. These passages are connected to the upstream side of the piping system, and to the inlet end of the metering pipe. Thus normal line flow propels the sphere into and through the metering pipe and past the detecting points, with delivery from the outlet end of the metering pipe back to the launching device. In this position of the sphere (either within or adjacent to the shuttle part), the main line flow continues about the sphere through the shuttle part to the downstream side of the piping system, until the shuttle part and sphere are again shifted to commence a metering cycle. At the commencement of and during the making of a metering run, the operator may detect any leakage between the inlet and outlet ends of the metering pipe. The leak-detecting means functions in conjunction with special sealing means between the movable part and the closed body.

Additional objects and features of the invention will appear from the following description in which the preferred embodiment has been set forth in detail in conjunction with the accompanying drawing.

DESCRIPTION OF THE PREFERRED EMBODIMENTS

Figures 3, 5:
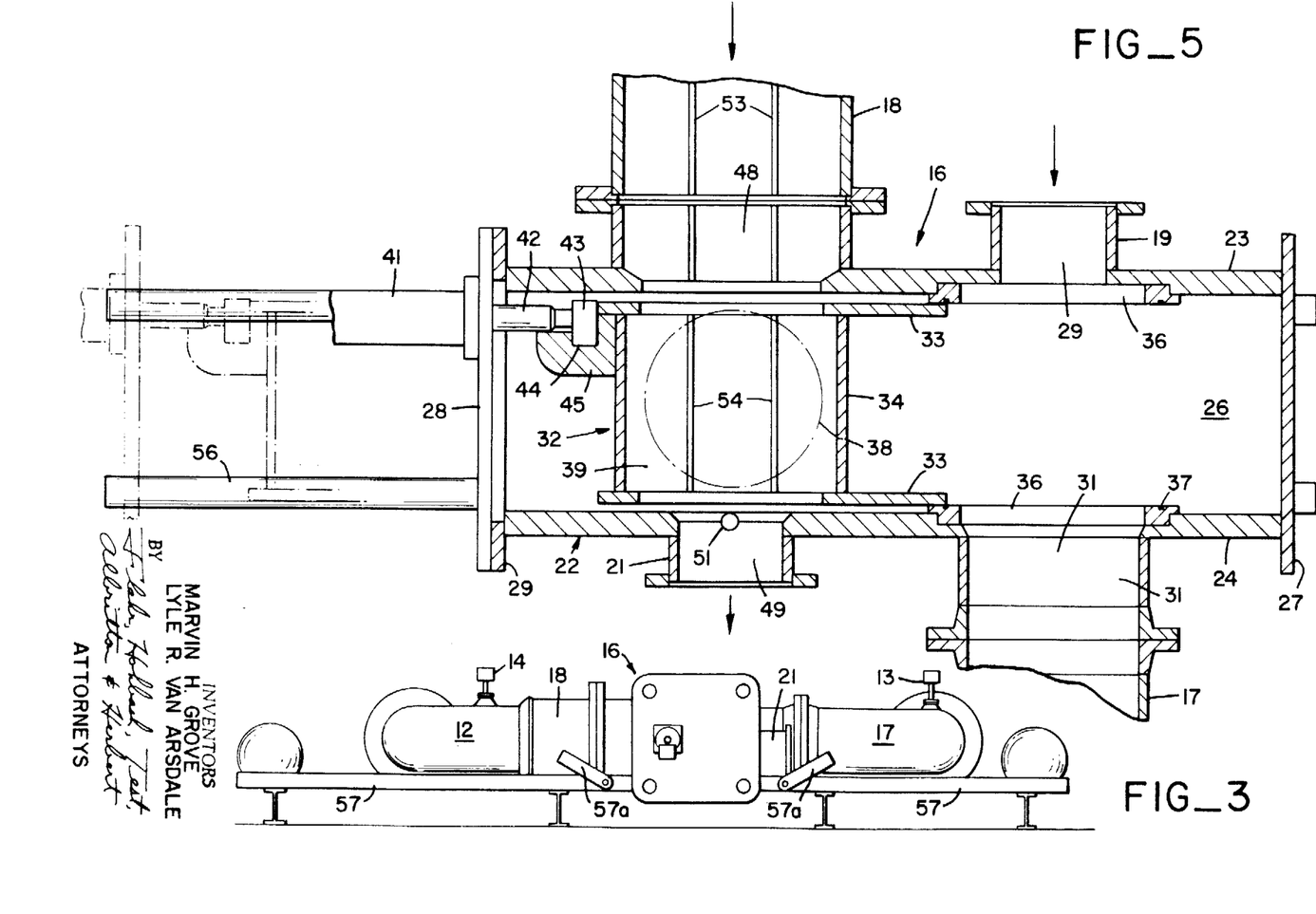
FIG. 3 is an end view of the metering apparatus, looking toward the left-hand end of FIG. 2.
FIG. 5 is a view similar to FIG. 4 but showing the shuttle part of the launching device in another operating position.
Figure 4:
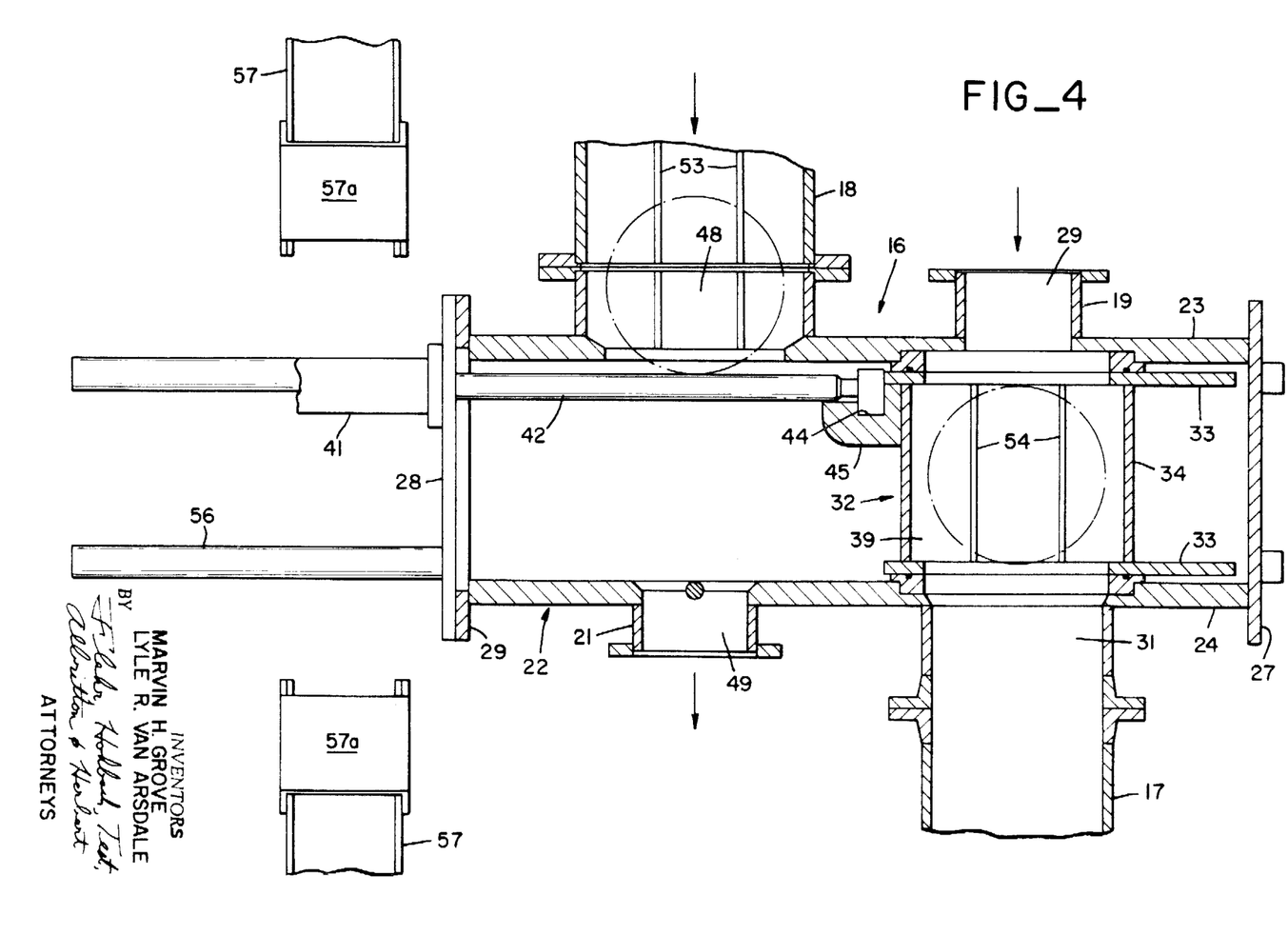
FIG. 4 is a cross-sectional detail in section showing the sphere-launching device and its connections to the metering loop and the upstream sides of the piping system.

The apparatus illustrated in the drawing consists of a metering pipe 10 which is generally in the form of a loop having inlet and outlet end portions 11 and 12. These portions are shown equipped with sphere-detecting devices 13 and 14 which serve to indicate passage of a sphere into and out of the pipe. The special sphere handling or launching device 16 is interposed between the inlet and outlet end portions of the pipe. Thus a bend connection 17 is made between device 16 and the inlet end portion 11, and a pipe section 18 of enlarged internal diameter connects the outlet portion 12 with device 16. Also device 16 has a direct flow connection 19 with the upstream side of the main piping system, and another connection 21 with the downstream side of the main piping system. A suitable construction for the devices 16 is shown in FIGS. 3, 4, and 5. It consists of a closed body 22 which is boxlike in transverse section, and may be fabricated from steel plate by welding. Thus flat parallel end walls 23 and 24 may be connected by welding to the flat parallel sidewalls 26. Plate 27 serves to close one end of the body. A second closure plate 28 is shown removably secured (as by bolts not shown) to the flange 29 on the other end of the body.

The end wall 23 is provided with an inlet flow passage 29 which connects with the upstream piping 19. The end wall 24 has a flow passage 31 which is aligned with the passage 29 and which connects with the pipe bend 17 and the portion 11 of the metering pipe. Within the closed body there is a shuttle part 32 which can be constructed of plates 33 welded to the ends of the sphere-accommodating portion 34, which may be annular in section.

Seat rings 36 are mounted on the end walls 23 and 24, and generally surround the flow passages 29 and 31. Each seat ring is provided with a sealing assembly 37 which is preferably made of resilient material and constructed as will be presently described in detail.

The two operating positions of the shuttle part 32 are shown in FIGS. 4 and 5. In FIG. 5 a sphere 38 of the kind used with meter provers is shown (dotted lines) accommodated in the space 39 within the shuttle part. The dimensions are such that line flow can readily occur about the sphere. For the position of the shuttle part shown in FIG. 4, the space 39 in the shuttle part is in registry with the flow passages 29 and 31, and therefore the sphere is in position to be launched by fluid flow into the inlet end of the metering pipe. The sphere is shown in dotted lines being moved by fluid flow into the bend 17 leading to the inlet portion 11 of the metering loop 10.

Power means is shown for moving the shuttle part 32 between the two operating positions described above. While various types of operating devices can be used, we prefer to employ an operator of the hydraulic type. Thus a hydraulic cylinder 41 is shown mounted upon the closure plate 28, and is provided with a fluid pressure operated piston connected to the operating rod 42. The end of this rod is provided with a head or nut 43 which is normally accommodated within a recess 44 formed in the lug 45. This lug is shown fixed to the shuttle part by welding. It will be evident that by supplying hydraulic liquid to one end of the hydraulic cylinder 41 while exhausting liquid from the other end of the cylinder, the shuttle part can be shifted between its two operating positions. For the position shown in FIG. 4 rod 42 serves as a sphere-detaining means whereby a sphere is detained from entering the body 22 until the shuttle part is moved to the position of FIG. 5.

The end walls 23 and 24 of the body 22 are also provided with inlet and outlet flow passages 48 and 49. Passage 48 connects with the outlet end of the metering pipe, while passage 49 (and pipe section 21) connects to the downstream side of the main piping system. Bars 51 are mounted on the end wall 24 within the passage 49 and form sphere-detaining means whereby a sphere is retained in space 39 for the position of the shuttle shown in FIG. 5.

Referring to FIGS. 4 and 5, it is desirable to provide ribs 53 in the flow passage 48, and also ribs 54 within the shuttle space 39. These ribs are spaced circumferentially and are dimensioned whereby they guide and generally centralize a sphere. Also they effectively guide a sphere as it passes out of the meter loop through passage 48 and into the shuttle part.

From time to time it is desirable to remove and replace the sphere. For this purpose, the plate 28 is made slidable upon the guide rods 56 which are fixed to the body 22. When the bolts securing the plate 28 to flange 29 are removed, the plates 28 can be slid to the left as viewed in FIG. 5 and shown in dotted lines, thus causing the shuttle part to be withdrawn from the body for removal of a sphere from the space 39. For convenience, trackways 57 with hinged extensions 57a can be provided adjacent the shuttle device for supporting spare spheres.

Figure 1:
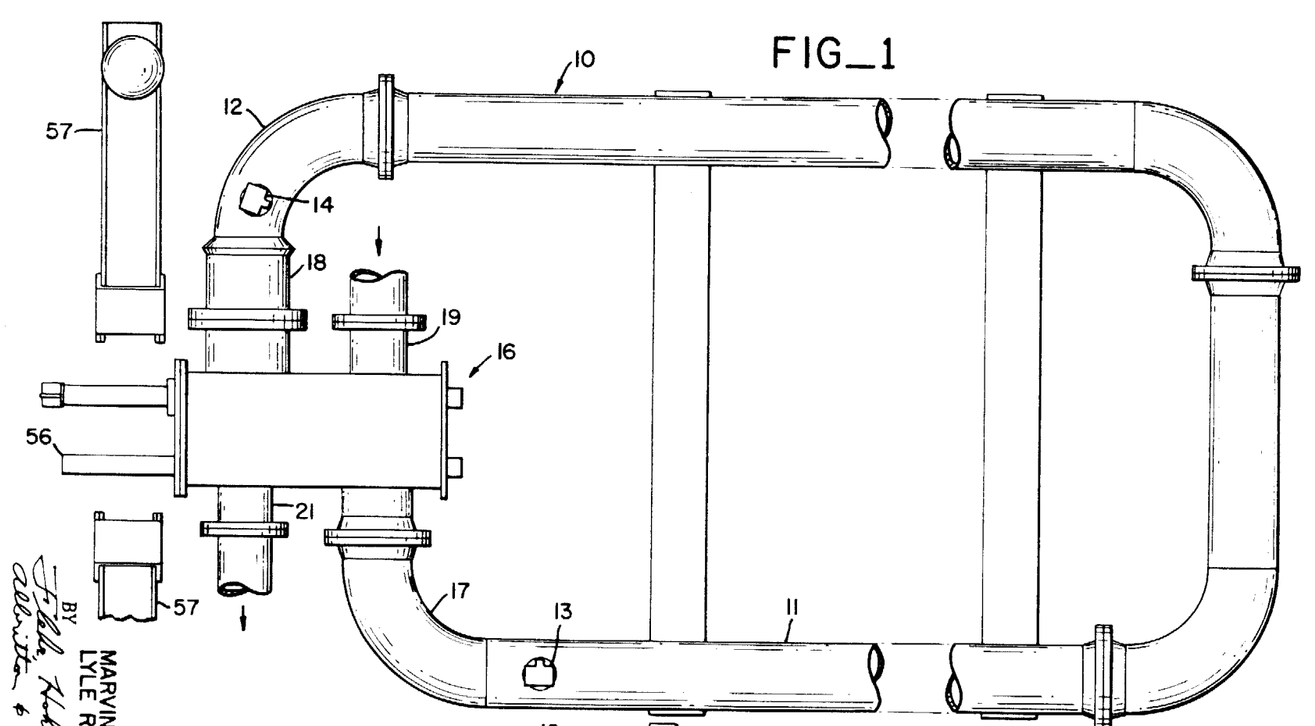
FIG. 1 is a plan view illustrating meter-proving apparatus in accordance with the present invention.
Figure 2:
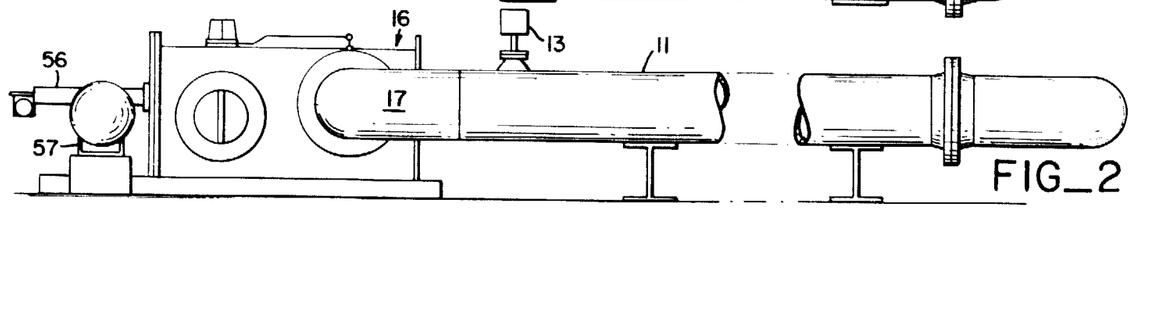
FIG. 2 is a side elevational view showing the apparatus of FIG. 1.

Although the apparatus can be installed in various positions, it is desirable in many instances to install the loop 10 horizontally as shown in FIG. 2, with the shuttle device likewise in a horizontal position for horizontal movements of the shuttle part. Since flow occurs directly through the device 16, there is a washing out action which prevents the accumulation of solid materials. Furthermore, there is no tendency for solid material to be recirculated through the loop.

Figure 6:
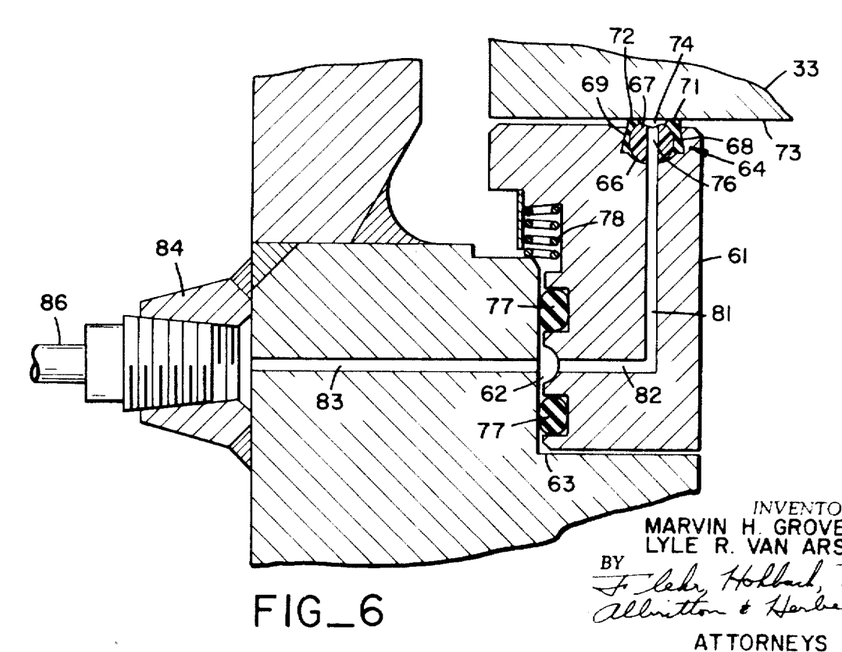
FIG. 6 is an enlarged detail in section showing one of the sealing assemblies and ducts for making connection to the exterior of the device.

A desirable construction for each of the sealing assemblies 37 is shown in FIG. 6. This construction is also shown in copending application Ser. No. 17,365 filed Mar. 9, 1970. It consists of a seat ring 61 made of metal and movably fitted within a cylindrical bore 62 which forms a part of the accommodating recess 63. That end of the seat ring 61 adjacent the plate 33 of the shuttle part is provided with a sealing assembly 64 accommodated within the recess 66. The assembly consists of an annular member 67 formed of material like nylon, together with more resilient members 68 and 69 which are interposed between the inner and outer peripheries of the nylon ring and the adjacent peripheral surfaces of the recess 66. The faces 71 and 72 formed by the members 68 and 69 press against the adjacent surface 73 of plate 33, thus forming fluidtight seals on spaced concentric areas. The nylon ring 67 is provided with a groove 74 which communicates with the duct 76. The seat ring 61 is sealed with respect to the adjacent body part by the seal rings 77 of the resilient O-ring type. Circumferentially disposed compression springs 78 serve to urge the seat ring 61 and the sealing assembly against the plate 33.

The duct 76 in the sealing assembly communicates to the exterior of the device through ducts 81 and 82 in the seat ring 61 and duct 83 in the adjacent portion of the body. By means of fitting 84 on the exterior side of the body, a tube or pipe 86 may be in communication with duct 83 and is employed for determining any leakage occurring past the sealing assemblies immediately preceding and during a metering run. Briefly, if both faces 71 and 72 are effectively establishing seals with the surface 73 of the plate 33 for both sides of the shuttle part, then if tube 86 is opened to the atmosphere no liquid will be discharged except for a small amount that may be trapped between the two sealing areas during movement of the shuttle part between its operating positions. If leakage is occurring past a sealing assembly, then after venting the corresponding pipe 86 to the atmosphere, some pressure buildup will be noted when the pipe is closed.

Figure 7:
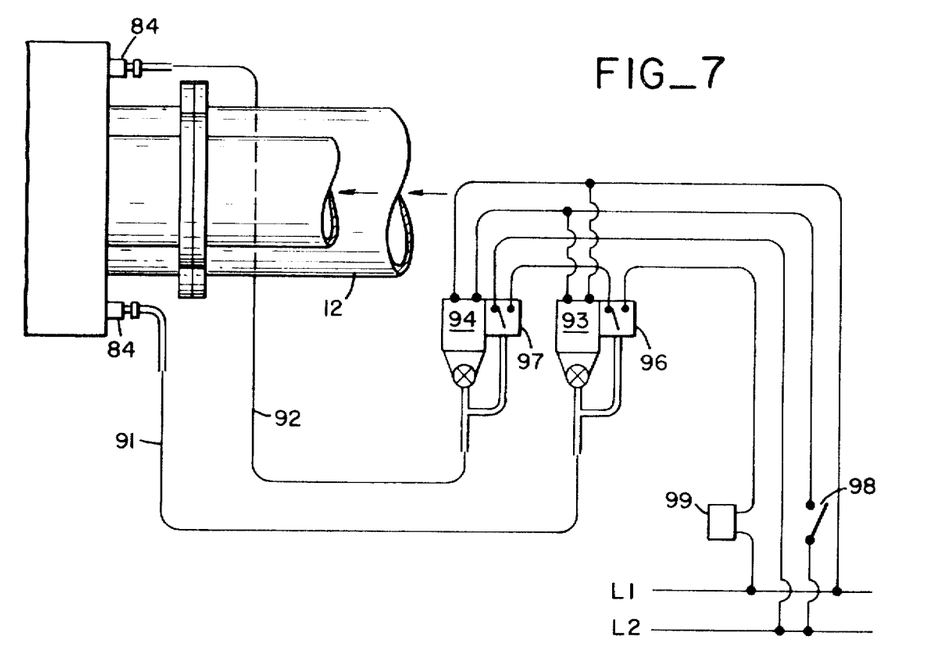
FIG. 7 is a schematic view illustrating means connected to the sealing assemblies for detecting leakage.

To facilitate detection of leakage at a remote station, the arrangement shown in FIG. 7 can be employed. Here the fittings 84 for the two sealing assemblies are connected to pipelines 91 and 92 which are controlled by the small electrically operated vent valves 93 and 94. When the winding of one of these valves is energized, it connects the associated line 91 or 92 to the atmosphere for a limited period of time whereby pressure in the line is reduced to atmospheric. Thereafter the line is closed and any pressure rise noted. Pressure rise can be noted by the electrically operated switches 96 and 97 which are likewise connected to lines 91 and 92. The energizing circuit for the windings of vent valves 93 and 94 may lead to a remote station as indicated, where it is controlled by closing the switch 98. The contacts of the pressure-operated switches 96 and 97 are preferably connected in series with a circuit which includes the indicating means 99 which may be a signal lamp. Thus at the beginning of a run, the operator at the remote station temporarily closes a switch 98, whereby the vent valves 93 and 94 are energized for a short period to open both lines 91 and 92 to the atmosphere. Thereafter both lines are closed but are in communication with the pressure-operated switches 96 and 97. If there is a pressure buildup in both sealing assemblies before the run is commenced, or if such a buildup occurs during a metering run, it is indicated by the device 99.

The indicating means described above is desirable in that it requires venting of only relatively small amounts of liquid from the spaces between the sealing areas. It indicates a leak only if both sealing assemblies are leaking, since both assemblies must leak to cause leakage of liquid between the inlet and outlet portions of the loop.

Operation of the apparatus described above is as follows. It is assumed that a sphere is within the space 39 of the shuttle part, and that the shuttle part is moved to the position shown in FIG. 4. Assuming now that flow is diverted from the main piping system into the inlet passage 29, the sphere is carried through the flow passage 31 and into the inlet end of the metering loop. As the sphere passes the detecting device 13, a signal pulse starts the run, and thereafter the sphere is propelled through the metering loop to the outlet end portion. When the sphere operates detector 14, the shuttle part 32 is moved back to the position shown in FIG. 5 whereby the space 39 is positioned in alignment with the flow passage 48. At the termination of the run the sphere is received within space 39 and comes to rest in engagement with the bars 54. In this position, flow may continue about the sphere into the downstream side of the main piping system. At the beginning of a new metering run, the shuttle part 32 is again moved back to the position shown in FIG. 4 which again brings the sphere into alignment with the passage 31 whereby it is again launched into the metering pipe. At the beginning the run, or in other words, immediately after the shuttle part has been positioned as shown in FIG. 4, the operator may determine whether or not there is any leakage by operating the vent valves 93 and 94 and observing whether or not there is any buildup of pressure in both of the sealing assemblies, which is noted by the indicating device 99. If a pressure buildup does occur in both sealing assemblies during the run, then the closing of the pressure-operated switches 96 and 97 operates the indicating device 99.

If it becomes necessary to replace a sphere, the plate 28 is unbolted from the body 22 and then withdrawn to the dotted line position shown in FIG. 5, whereby the sphere is made accessible for removal from space 39. After replacing the sphere, the parts are returned to bring the shuttle part into the position shown in FIG. 5, after which plate 28 is again secured to the flange 29.

It will be evident from the foregoing that we have provided a meter-proving method and apparatus having many advantages over devices which have been used in the past. The sphere-launching device is relatively simple in construction and operation, and greatly simplifies the launching of a sphere after it is retrieved at the end of a metering run. The sphere-launching device avoids the necessity of using two separate gate valves as with the apparatus shown in U.S. Pat. No. 3,387,483. Accumulation of solid material in the metering loop and in the connecting means is avoided because the direct flow of liquid through the launching device washes out any solids tending to accumulate therein and avoids recirculation of such solids through the loop.

In explanation of the appended claims, the flow passages 29 and 31 can be referred to as first and second passages, and flow passages 48 and 49 as third and fourth passages.

Figure 8:
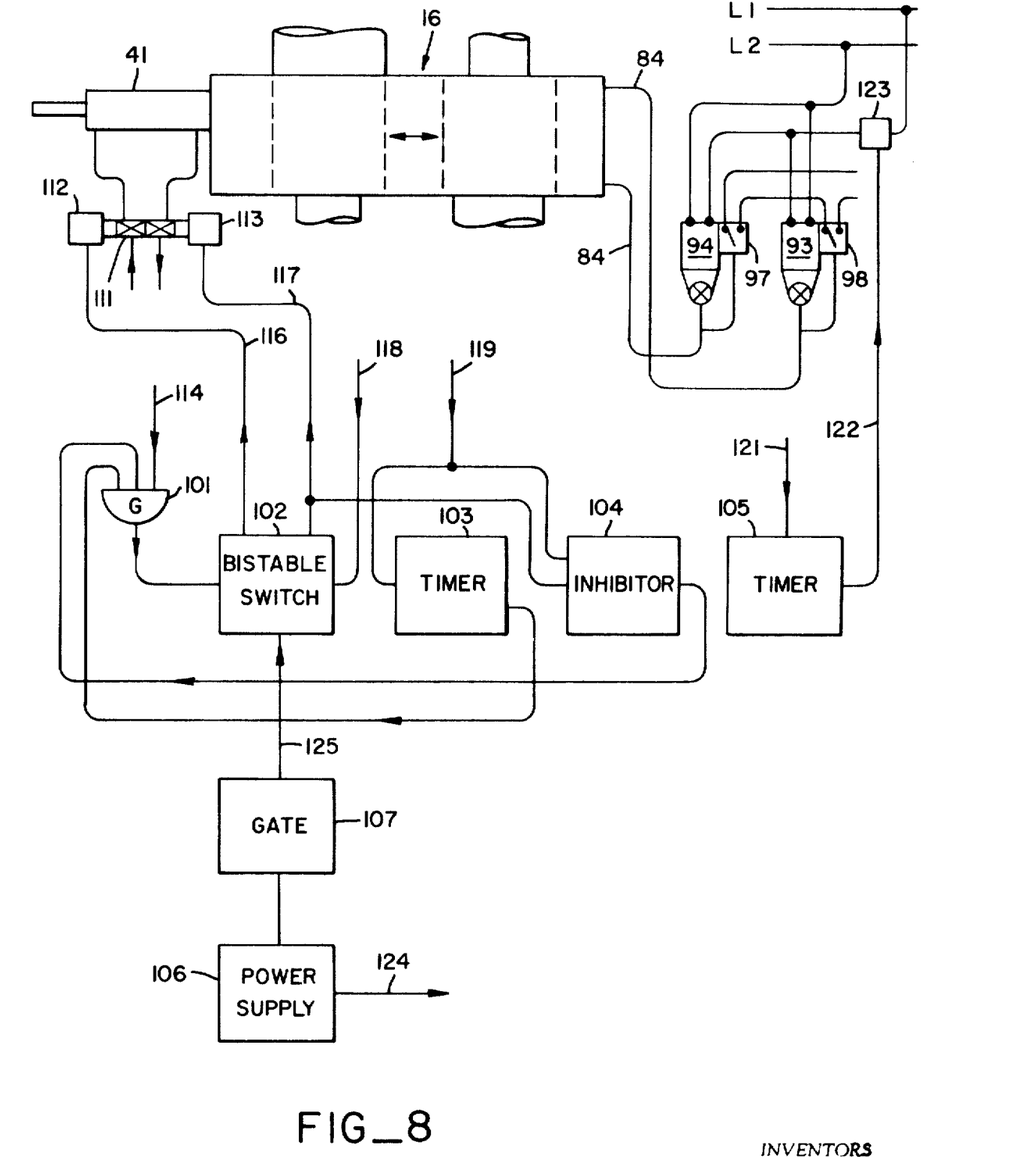
FIG. 8 is a block diagram schematically illustrating an electrical system for automating the sphere-launching device.

It is desirable to provide an electrical system for automating operation of the apparatus whereby when initiated by an operator the apparatus will carry out a complete proving cycle. A block diagram of such an electrical system is shown in FIG. 8. The parts of the system illustrated in FIG. 8 consist of an electronic gate 101, a bistable electronic switch 102, an electronic timer 103, a so-called inhibitor 104, and an electronic timer 105. It is assumed that the electronic power supply 106 supplies current to all of the circuitry. A power-detecting gate 107 is interposed between the power supply and the bistable switch 102.

The schematically illustrated sphere-handling device 16 is shown having its power operator 41 with hydraulic connections through the four-way control valve 111, with this valve in turn operated by the solenoids 112, 113 or other motive means. Solenoids 112 and 113 are selectively operated by commands from the bistable switch 102 as indicated, and the condition of this switch is controlled by commands as will be presently explained.

The electronic gate 101 is controlled by commands from both the inhibiting device 104 and the timer 103. Also it is controlled by a cycle-initiating command as indicated by line 114. Lines 116 and 117 represent commands from the bistable switch 102 to the solenoids 112, 113 for operating the shuttle of device 16 between its sphere catching and launching positions. Line 118 represents a command from the sphere detector 14 to the bistable switch 102. Line 119 represents a command from a limiting switch associated with the operating rod for the shuttle part and which functions when the shuttle part is moved to sphere-catching position. Line 121 represents a command from another limiting switch associated with the shuttle part and which is applied to the timer 105 when the shuttle part is moved to its sphere-launching position.

FIG. 8 also shows substantially the same leak-detecting means as in FIG. 7. The solenoid-operated vent valves 93 and 94 are connected to the pipelines 91 and 92 which in turn connect with the spaces between the dual sealing areas. The pressure-operated switches 97 and 98 have their contacts connected in series with the circuit leak indicating circuit. Line 122 represents a command from the timer 105 to the switch means 123 which serves to energize the solenoid-operated vent valves 93 and 94.

The power supply 106 supplies all of the circuitry of the system, as indicated by line 124. The gate 107 supplies a command represented by line 125 on the application of power, to force the bistable switch 102 into a condition corresponding to sphere-catching position of device 16.

Operation of the electronic system illustrated in FIG. 8 is as follows. A manual command is not transmitted to the bistable switch 102 if the gate 101 is closed by a blocking command from the inhibiting device 104 and timer 103. Assuming that the command is transmitted through the gate 101, then bistable switch 102 moves to a condition in which it issues a command through line 116 to condition the four-way control valve 111 to supply hydraulic liquid to the operator 41 in such a manner as to rapidly move the shuttle part from sphere-catching to sphere-launching position. The sphere is now launched into the inlet end of the metering pipe, and the meter-proving run is commenced when the sphere passes the first detector 13. When the sphere passes the second sphere detector 14, a command 118 is applied to the bistable switch 102 which in turn supplies a command through line 117 to cause the hydraulic operator 41 to move the shuttle part back to sphere-catching position. At the time the shuttle part is first moved to the sphere-launching position, its limiting switch causes a command 121 to be sent to the timer 105 and to the switch 123 to cause the solenoid valves 93 and 94 to be immediately energized for a short period to vent the spaces between the sealing areas of the sealing assemblies. After a predetermined short period of venting time, both solenoid valves are reclosed before the sphere reaches the first detector, and thereafter any leakage past both assemblies will cause the pressure switches 97 and 98 to be operated to close the leak-detecting circuit. At the time the bistable switch 102 sends a command through line 117 to cause the hydraulic operator 42 to move the shuttle part back to sphere-catching position, a command is also sent to the inhibiting device 104 whereby this device sends a blocking command to the gate 102, thus blocking any further commands to initiate a new proving cycle. When the shuttle part has completed its movement to sphere-catching position, a limiting switch sends a command 119 which sets the timer 103 in operation, and at the same time reconditions the inhibiting device 104 whereby the blocking command previously applied by this device to gate 101 is removed. Timer 103 provides a small time interval following movement of the shuttle part to sphere-catching position to ensure that the sphere is within the shuttle part before a new proving cycle can be initiated.

Figure 9:
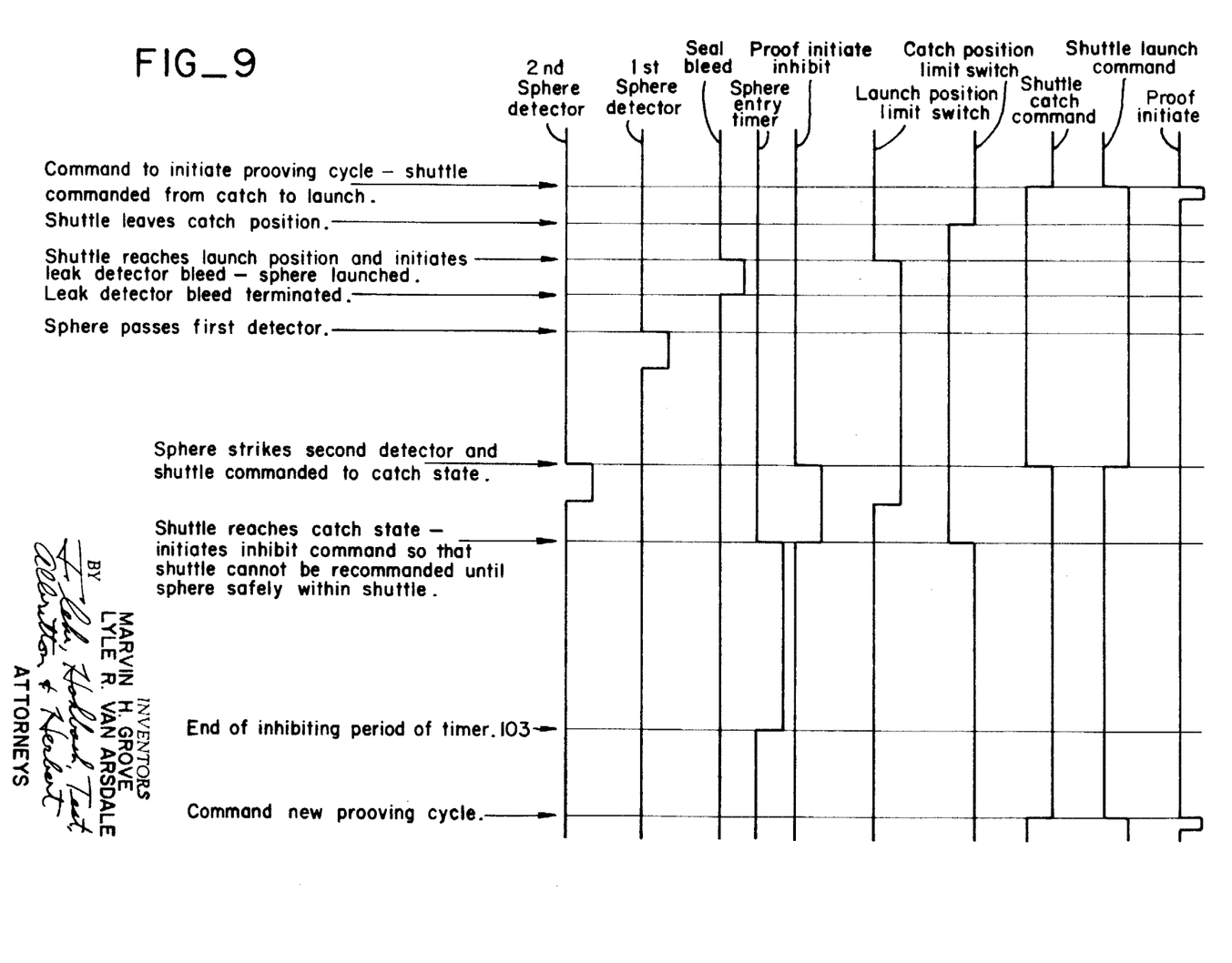
FIG. 9 is a diagram illustrating a complete automated cycle for the apparatus, the cycle starting with the shuttle part in sphere-catching position.

The cycle of operation described above with reference to FIG. 8 is graphically illustrated in FIG. 9. The right-hand vertical lines of this figure represent operating positions of various parts. The upper part of the figure represents the completion. The left-hand portion of the figure consists of legends explaining various stages of the cycle by reference to the positioning of parts as represented by jogs in the vertical lines. It will be seen that the cycle begins with a command to initiate a proving cycle, at which time the shuttle part is in the sphere-catching position. The next step in the automated cycle is for the shuttle part to commence rapid movement from its sphere-catching position to the sphere-launching position. The next step is to initiate operation of the vent valves 93 and 94 of the leak detector means immediately when the shuttle part reaches launching position. The next step is for the launched sphere to pass the first sphere detector, which represents the beginning of a prover run. The next step is for the sphere to reach the second sphere detector, which causes a command to be applied to commence return movement of the shuttle part from launching to sphere-catching position. The next step is for the shuttle part to reach sphere-catching position, and this causes a command to be applied which prevents application of a command to start a new run until the sphere is safely within the shuttle part. The next phase is for the timer 103 to reach the end of its timing period, thereby conditioning the gate 101 to receive a new command and to initiate a new cycle. Application of such a new command is indicated at the bottom of the figure.

The automated cycle described above has a number of desirable features. The cycle makes unnecessary the use of a detent pin for releasing the sphere after it is launched by the device 16. Leak detection is carried out after the sphere has moved to launching position and started on its path of movement into the proving pipe, thus proving a leak detection immediately before the sphere reaches the first sphere detector, as distinguished from initiating a venting operation to detect leaks before the cycle is commenced. This is made possible because of the relatively small amount of liquid which is vented from the dual sealing areas, as previously described in connection with FIG. 7.

We claim:

1. A meter-proving method making use of a length of metering pipe through which the flow of a piping system can be diverted and adapted to receive a sphere that is propelled through the metering pipe between predetermined sphere-detecting points by liquid flow, the steps of loosely retaining a sphere in a movable shuttle part that is enclosed within a body, shifting the shuttle part from a first to a second position in which the sphere is in alignment with inlet and outlet flow passages in the body, directing flow from the upstream side of the piping system through the inlet flow passage to cause the sphere to be launched into the inlet end of the metering pipe and propelled therethrough, causing the sphere to be delivered directly from the outlet end of the metering pipe to a third inlet flow passage in the body and into the shuttle part while flow is maintained through the shuttle part and about the sphere, causing said last-named flow to be delivered to the downstream side of the piping system through a fourth flow passage in the body, and then again shifting the shuttle part and the sphere into alignment with the first-named passages for relaunching the sphere.

2. A method as in claim 1 in which any leakage of liquid directly between the inlet and outlet ends of the metering pipe is detected after the sphere is launched and before it reaches the first detector.

3. A meter-proving apparatus comprising a sphere-launching device, said device consisting of a body, first, second, third and fourth flow passages in the body, the first and second flow passages being in alignment, and the third and fourth flow passages likewise being in alignment, a shuttle part movable between two limiting positions disposed within the body, said shuttle part having a sphere-accommodating space which is brought into alignment with the first and second flow passages, or the third and fourth flow passages, for the two limiting positions, a meter-proving pipe, a connection between the second flow passage and the inlet end portion of the metering pipe, means forming a connection between the third flow passage and the outlet end portion of the metering pipe, means forming a connection between the upstream side of the main piping system and the first flow passage, means forming a connection between the fourth flow passage and the downstream side of the main piping system, and means for shifting said shuttle part between said two operating positions, in one of which said space is in alignment with the first and second flow passages, and in the second of which said space is in alignment with the third and fourth passages.

4. Apparatus as in claim 3 together with sealing means interposed between the side portions of said shuttle part and the end walls of the body, said sealing means being carried by said end walls and generally surrounding said first and second flow passages.

5. Apparatus as in claim 3 together with bonnet means forming a closure for one extremity of the body, said bonnet means being removable to permit withdrawal of the shuttle part from the body.

6. Apparatus as in claim 3 together with power means for moving the shuttle part between its operating positions, said power means including motive means, a rod connecting said motive means with said shuttle part, said rod extending substantially across said third flow passage when the shuttle part and said sphere-receiving space are in alignment with the first and second flow passages.

7. A sphere-launching device for use with meter provers of the type including a meter-proving pipe having inlet and outlet end portions and adapted to receive a flow-propelled sphere, said device comprising a body having opposed end walls having first, second, third and fourth flow passages in the same, the first and second passages being in alignment and the second and third passages likewise being in alignment, the first passage being adapted to communicate with the upstream portion of a liquid piping system and the second flow passage being adapted to communicate with the inlet end portion of the metering pipe, the third flow passage being adapted to communicate with the outlet end portion of the metering pipe, and the fourth flow passage being adapted to communicate with the downstream side of the piping system, a shuttle part disposed within the body and movable between first and second operating positions, said shuttle part including a portion providing a space for accommodating a sphere, means forming sealing assemblies surrounding the first and second flow passages when the shuttle part is in its first operating position, said sealing assemblies forming fluidtight seals between the body and the shuttle part, said sphere-accommodating space being in alignment with the first and second flow passages when the shuttle part is in said first operating position and likewise being in alignment with the third and fourth passages when the shuttle part is in its second operating position, said shuttle part when in said first operating position permitting a sphere carried by the same to be launched into the inlet end portion of the metering pipe and when in said second operating position serving to receive a sphere delivered from the outlet end portion of the metering pipe, and means for shifting the shuttle part between said first and second operating positions.

8. A sphere-launching device as in claim 7 in which the body is in the form of a box that is rectangular in section having end walls in which the said flow passages are formed and in which the shuttle part consists of spaced plates extending parallel to said end walls and secured to the ends of said portion forming said sphere-receiving space.

9. A sphere-launching device as in claim 8 together with power means for moving said shuttle part between said two operating positions and bonnet means mounted on one extremity of the body and serving to carry said power means, said power means including an operating rod having one end of the same mechanically coupled to the shuttle part.

10. A device as in claim 9 in which said bonnet means is detachable to permit removal of the shuttle part.

11. A device as in claim 9 in which said rod extends across said third flow passage to block passage of a sphere through the same when the shuttle part is in said first position.

12. A meter-proving method making use of a length of meter-proving pipe through which the flow of a piping system can be diverted and adapted to receive a sphere that is propelled through the metering pipe between predetermined sphere-detecting points by liquid flow, there being a sphere-handling device to which the ends of the metering pipe are connected, the device having a shuttle part which can be moved to one limiting position for receiving and retaining a sphere being discharged from the metering pipe and being movable to a second limiting position where the sphere is launched into the inlet portion of the metering pipe, the method comprising the following steps carried out in sequence, commencing with the sphere within the shuttle part, shifting the shuttle part from sphere-catching to sphere-launching position to cause the sphere to enter the inlet portion of the metering pipe, initiating a leakage detection operation immediately after the shuttle part has moved to sphere-launching position and before the sphere has reached the first sphere detector, said leak-detecting operation serving to determine whether or not any leakage is occurring directly between the inlet and outlet ends of the metering pipe through said sphere-handling device, commencing the proving run when the sphere passes the first sphere detector, completing the run when the sphere passes the second sphere detector, causing the shuttle part to be moved back to its sphere-catching limiting position with such movement being commenced when the sphere passes said second sphere-detecting point and then inhibiting the commencement of a new prover cycle for a predetermined time after the shuttle part has been returned to sphere-catching position thereby ensuring proper positioning of the sphere within the shuttle part before the commencement of a new proving cycle.

* * * * *